(12) United States Patent
Rausch et al.

(10) Patent No.: US 8,869,752 B2
(45) Date of Patent: Oct. 28, 2014

(54) CAST IRON OR ALUMINUM SECTIONAL BOILER

(75) Inventors: Rainer Rausch, Alsfeld (DE); Gerhard Jung, Fronhausen (DE); Holger Henrich, Lahnau (DE)

(73) Assignee: Robert Bosch GmbH, Stuttgart (DE)

( * ) Notice: Subject to any disclaimer, the term of this patent is extended or adjusted under 35 U.S.C. 154(b) by 694 days.

(21) Appl. No.: 12/737,731

(22) PCT Filed: Aug. 12, 2009

(86) PCT No.: PCT/EP2009/060416
§ 371 (c)(1),
(2), (4) Date: Apr. 21, 2011

(87) PCT Pub. No.: WO2010/018187
PCT Pub. Date: Feb. 18, 2010

(65) Prior Publication Data
US 2011/0185987 A1 Aug. 4, 2011

(30) Foreign Application Priority Data
Aug. 14, 2008 (DE) .......................... 10 2008 037 762

(51) Int. Cl.
*F22B 23/00* (2006.01)
*F24H 8/00* (2006.01)
*F24H 9/00* (2006.01)
*F24H 1/32* (2006.01)

(52) U.S. Cl.
CPC .. *F24H 1/32* (2013.01); *F24H 8/00* (2013.01); *F24H 9/0042* (2013.01); *F24H 9/0015* (2013.01); *Y02B 30/102* (2013.01)
USPC .................................... 122/209.1; 122/225 R

(58) Field of Classification Search
USPC .......... 122/209.1, 214, 216, 217, 223, 225 B, 122/225 R, 230, 231, 244, 31.1, 33
See application file for complete search history.

(56) References Cited

U.S. PATENT DOCUMENTS

| | | | | |
|---|---|---|---|---|
| 650,151 A * | 5/1900 | Lawrence | ..................... | 122/167 |
| 2,516,057 A * | 7/1950 | Knox | ......................... | 122/225 R |
| 2,935,052 A | 5/1960 | Mueller | | |
| 3,215,125 A * | 11/1965 | Mueller | ..................... | 122/225 R |
| 3,618,572 A * | 11/1971 | Nauert | ...................... | 122/225 R |
| 3,626,908 A * | 12/1971 | Arndt | ............................ | 122/231 |
| 3,799,122 A * | 3/1974 | Viessmann | ............... | 122/225 R |
| 4,062,325 A * | 12/1977 | Meier et al. | ............... | 122/225 R |
| 8,091,515 B2 * | 1/2012 | Rigamonti | ................. | 122/367.1 |
| 2012/0055420 A1 * | 3/2012 | Jung et al. | .................. | 122/135.1 |

FOREIGN PATENT DOCUMENTS

| | | | |
|---|---|---|---|
| DE | 1889169 | 3/1964 | |
| DE | 86 34 369 | 2/1987 | |
| DE | 3715198 A1 * | 11/1988 | .............. C23C 26/02 |
| DE | 296 21 817 | 3/1997 | |

(Continued)

*Primary Examiner* — Gregory A Wilson
(74) *Attorney, Agent, or Firm* — Kenyon & Kenyon LLP

(57) ABSTRACT

A cast iron or aluminum sectional boiler has essentially annular sections, one front section, one rear section and at least one center section being provided which form a furnace chamber having essentially surrounding heating gas passages, and their annular water compartments are connected to one another via hubs. The sections have one return connection piece and one feed connection piece, one flue spigot as well as at least two anchor rods for holding the section block together. Annular gaps are provided as heating gas passages between each two adjacent sections, and that the heating gas passages are subdivided into a primary section and a secondary section.

18 Claims, 3 Drawing Sheets

(56) References Cited

FOREIGN PATENT DOCUMENTS

| DE | 10103277 | 9/2001 |
| DE | 10 2004 023 711 | 10/2005 |
| DE | 10 2004061824 | 8/2006 |
| DE | 102004061824 | 8/2006 |
| DE | 10 2008013086 | 9/2009 |
| EP | 0062110 | 10/1982 |
| EP | 127881 A1 * 12/1984 ................ F24H 1/32 |
| SU | 142398 | 1/1961 |

* cited by examiner

CAST IRON OR ALUMINUM SECTIONAL BOILER

BACKGROUND OF THE INVENTION

1. Field of the Invention

The present invention relates to a cast iron or aluminum sectional boiler, in particular a condensing boiler.

2. Description of Related Art

Sectional boilers of this type are made up of a plurality of boiler sections cast in one piece which are situated one behind the other and connected to one another by hubs on the water side. Flow takes place through the water channels and water pockets formed by the boiler sections between the return connection and the feed connection. Sectional boilers according to the definition of the species generally have a lower return connection and a feed connection situated at the top, preferably in the particular hub. The heating gases overflow from the furnace chamber via downstream heating gas passages to a flue spigot and transmit heat to the boiler water on their way.

In all previous boilers of this type, the sections are situated in series one behind the other. There is an annular front section to which a furnace chamber door or a burner plate may be attached, one or more similarly designed center sections depending on the magnitude of the output, and a rear section. The furnace chamber extends through front and center sections to the rear section, which with its cover-like design, forms the floor of the furnace chamber. In these specific embodiments, all boiler sections have similar outside dimensions because they form parts of the furnace chamber, the heating gas passages and the water compartment across the entire boiler cross section. Furthermore, boilers for low output ranges which are made up of only two or even only one boiler section are also known.

With respect to the flue gas routing and the efficiency of the heating units, a distinction is made between thermal power technology and condensing boiler technology. More and more condensing boiler devices are being used for reasons of saving energy. The design of their heat exchanger allows for the possibility of cooling down the moist flue gases arising in operation during the combustion of fuel and air to below the flue gas dew point. During this process, the moisture of the flue gases is condensed out and in addition to the perceptible heat, the heat of condensation is transferred to the hot water.

When used as a condensing boiler, special attention must be given to the selection of materials, as the flue gases are contaminated due to the composition of the fuel used and due to the combustion process, and the accumulating condensation water contains various acids at a low concentration. The components in contact with condensation water such as heating surfaces, flue gas collectors, and the flue gas must thus be resistant to the acids, which is why these components are usually produced from stainless steel, aluminum, or plastic. Welded stainless steel heat exchangers are generally used, especially in oil condensing boiler technology, as is described, for example, as a helically wound pipe in published German patent application document DE 10 2004 023 711 B3. They offer the advantage of standing up to the high level of acidity without corrosion. Disadvantages are the high costs associated with the material as well as the less favorable scaling conditions in particular in welded sheet metal constructions and the larger physical sizes which make assembly difficult in confined spaces.

The heat exchangers of conventional thermal power boilers are frequently manufactured from cast iron. They are distinguished by high robustness and long life. Being assembled from mostly identical cast segments, they allow cost-effective production and easy scalability with respect to different magnitudes of output and offer good assembly possibilities even in confined installation conditions. The material stands up very well to brief flue gas condensation phases when operation is started and the heat exchanger is cold. In its present form and design, the only area where cast iron is not suitable is in a condensing boiler operation with extended accumulation of condensation water.

Furthermore, a condensing boiler having a compact heat exchanger made of corrosion-resistant material, which is integrated and connected downstream hydraulically, is known from published German utility model application document DE 296 21 817 U1. As a separate component, this compact heat exchanger is surrounded by two bowl-shaped boiler sections and connected separately on the water side. All boilers having a downstream heat exchanger have the disadvantages that the assembly expense is increased by the necessary pipe components and resistance on the water side rises. As a separate, external component, the system also causes cooling losses which must be reduced by suitable thermal insulation.

BRIEF SUMMARY OF THE INVENTION

An object of the present invention is to optimize a cast iron or aluminum sectional boiler, in particular with respect to compactness and robustness.

The cast iron or aluminum sectional boiler is characterized in that annular gaps are provided between each of two adjacent sections as heating gas passages, and that the heating gas passages are subdivided into a primary section and a secondary section. In this connection, the heating gas passages run roughly radially outwards in the primary section starting from the furnace chamber and discharge into a flue gas collection chamber on the outside of the sections. There the heating gases overflow into the secondary section and enter at least one heating gas passage in the secondary section which runs approximately radially inwards starting from the flue gas collection chamber to a flue spigot.

Each of two adjacent sections has a matching geometry for forming an annular gap. To that end, different specific embodiments are possible, namely in the first case that an annular gap runs at a right angle to the central axis of the furnace chamber radially and in a straight line to the outside in the primary section and to the inside in the secondary section. In a second variant, an annular gap is radially curved and runs to the outside in the form of an arch radially curved in the primary section, similar to the geometry of a turbine blade, and to the inside in the secondary section. In a third specific embodiment, it is provided that an annular gap tilted with respect to the central axis of the furnace chamber in the primary section runs in a straight line to the outside tilted with respect to the central axis of the furnace chamber and to the inside in the secondary section. This is suitable in particular if the entire section block is in a standing position because the condensate is well able to drain downwards all around from one gap. Furthermore, an annular gap may also run radially to the outside in a wave-like fashion in the primary section and to the outside in the secondary section, in particular to increase the flow turbulence within a gap, so that an intensive heat transfer is achieved on the surfaces.

Advantageously, the width and/or the open cross section of an annular gap diminishes from the furnace chamber to the opening on the outside of the sections in the primary section and from the flue gas collection chamber to the flue spigot to the inside in the secondary section. This causes the heating gas volume which diminishes as it cools down along the entire flow path to be adjusted. The surfaces of the sections contacted by the heating gas, at least the surfaces forming the gap, may be provided with a corrosion-resistant coating.

The flue gas collection chamber on the outside of the sections, into which the annular gaps discharge or from which the at least one secondary side gap discharges, extends in the form of a hollow cylinder around the outer jacket surfaces of the sections and is limited to the outside by a jacket. This jacket is sealingly accommodated between annular webs projecting radially outwards on the outside of the front and rear sections.

In order to form a forced flow, the hubs between the return connection and feed connection may be closed reciprocally, preferably alternately, at the top and bottom. This process ensures an alternating overflow between two adjacent sections in the upper and lower hub over the length of the section block.

According to the present invention, at least one hub between the primary section and the secondary section is closed using closure means. In addition, the feed connection piece in the area of the primary section and the return connection in the area of the secondary section are situated in such a way that the cooler return water first enters the secondary section and afterwards overflows through at least one hub into the primary section. As a result, the flue gas is cooled down in the secondary section to nearly the inlet temperature of the return water.

In one example embodiment of the present invention, a furnace chamber floor center section is therefore additionally provided, which together with the front section and at least one center section, forms the furnace chamber and limits its depth. In this case, the front section and at least one center section are part of the primary section on the water and heating gas side. In contrast, the rear section and the furnace chamber floor center section form the secondary section at least on the water side by closing the at least one hub between the furnace chamber floor center section and the adjacent center section.

In another embodiment, the rear section forming the secondary section and the furnace chamber floor center section may be supplemented by at least one associated additional center section. Together, these sections form the secondary section on at least the water side, a plurality of gaps flushed with return water then being available for an intensive heat exchange.

Alternatively, the rear section forming the secondary section and the furnace chamber floor center section may be supplemented by at least one associated additional center section; however, the secondary section is formed at least on the water side by the rear section alone together with at least one associated additional center section. To that end, at least one hub is closed between the furnace chamber floor center section and the adjacent additional center section. The furnace chamber floor center section is in this case associated to the primary section on the water side.

The flue spigot is advantageously situated on the common center axis of sections and furnace chamber. The rear section, furnace chamber floor center section and the at least one additional center section possess at least one through hole as an elongation of the flue spigot. This through hole is closed within the furnace chamber floor center section on the heating gas side using a seal plug which, for example may be loosened and removed for cleaning purposes.

At least two centering points or surfaces which represent the unfinished casting dimensions and tolerances particularly well are provided on each section for maintaining an exact gap size between two adjacent sections. The thickness of the section in particular has a direct influence on the gap width between two sections. These centering points or surfaces determine the mechanical machining of the sealing or contact surfaces on the hubs, as this allows detection of the actual final dimension after the casting process at the decisive point and then sets it to the desired and individually exactly fitting setpoint dimension via machining.

The present invention creates a sectional boiler optimally suitable for a condensing boiler operation, the positive material properties of cast iron or aluminum being specifically applied and utilized to ensure good thermal transfer properties, compactness, and robustness. Corrosion-inducing exposures are brought under control. According to the present invention, the corrosion-resistant coating itself is not only easy to apply and control, it is also protected against possible mechanical stresses in the gaps.

The division of the water and heating gas side into a primary and a secondary section results in an intensive heat exchange which is optimally adjusted to the temperatures prevailing in the particular areas. This results in very high efficiency without an increase of the complexity of the components and without limitations in cleaning properties.

In addition to simple manufacturing, the design of the sections offers the advantage that it is possible to variably adjust for different firing capacities and heat exchanger outputs by inserting additional center sections of varying lengths. Nonetheless, all attachment components situated preferably on the face part and all water-side connections remain the same. Only the jacket surrounding the flue gas collection chamber varies. Due to the low flue gas temperatures, the flue gas collection chamber may even be manufactured from plastic.

DETAILED DESCRIPTION OF THE INVENTION

Figure 1:
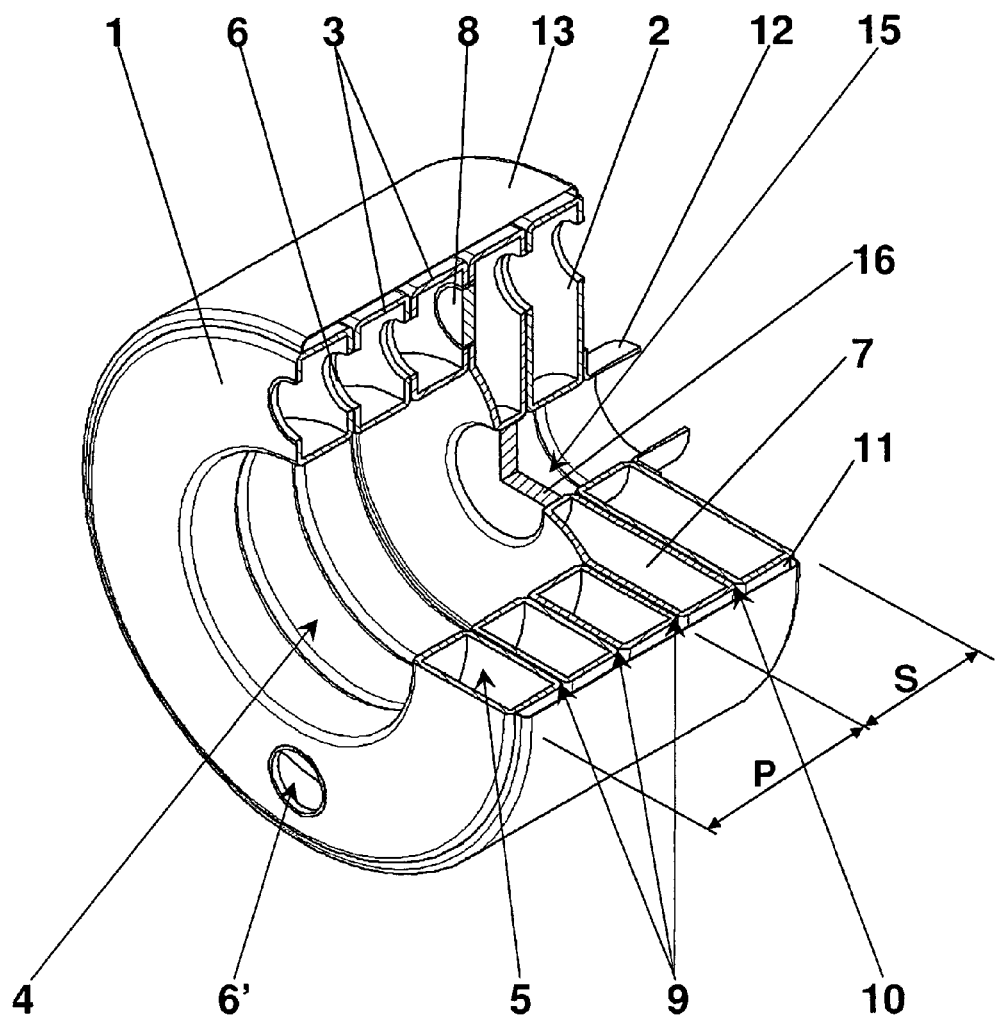
FIG. 1 shows an overall perspective view of an example embodiment having a section in the upper corner area.

The sectional boiler is essentially made up of annular sections, namely a front section 1, a cover-like rear section 2, and a plurality of center sections 3. These sections constitute a furnace chamber 4 and their annular water compartments 5 are connected to one another via hubs 6, 6'.

According to the present invention, the heating gas passages are subdivided into a primary section P and a secondary section S. A furnace chamber floor center section 7 is additionally provided for this purpose. Together with front section 1 and at least one center section 3, this furnace chamber floor section forms furnace chamber 4 and limits its depth. Front section 1 and at least one center section 3 are thus part of the primary section on the water and heating gas side, while rear section 2 and furnace chamber floor center section 7 form the secondary section at least on the water side. To that end, at least one hub 6, 6' is closed between furnace chamber floor center section 7 and adjacent center section 3 using closure means 8.

Annular gaps 9, 10 are provided between each two adjacent sections 1, 2, 3, 7 as heating gas passages. Each of the heating gas passages runs roughly radially outwards in primary section P starting from furnace chamber 4 and discharges into a flue gas collection chamber 11 on the outside of sections 1, 2, 3, 7, the heating gases overflowing there into secondary section S. In secondary section S, a heating gas passage runs approximately radially inwards, starting from flue gas collection chamber 11, between rear section 2 and furnace chamber floor center section 7 to a flue spigot 12 in the center of secondary section S.

Figure 2:
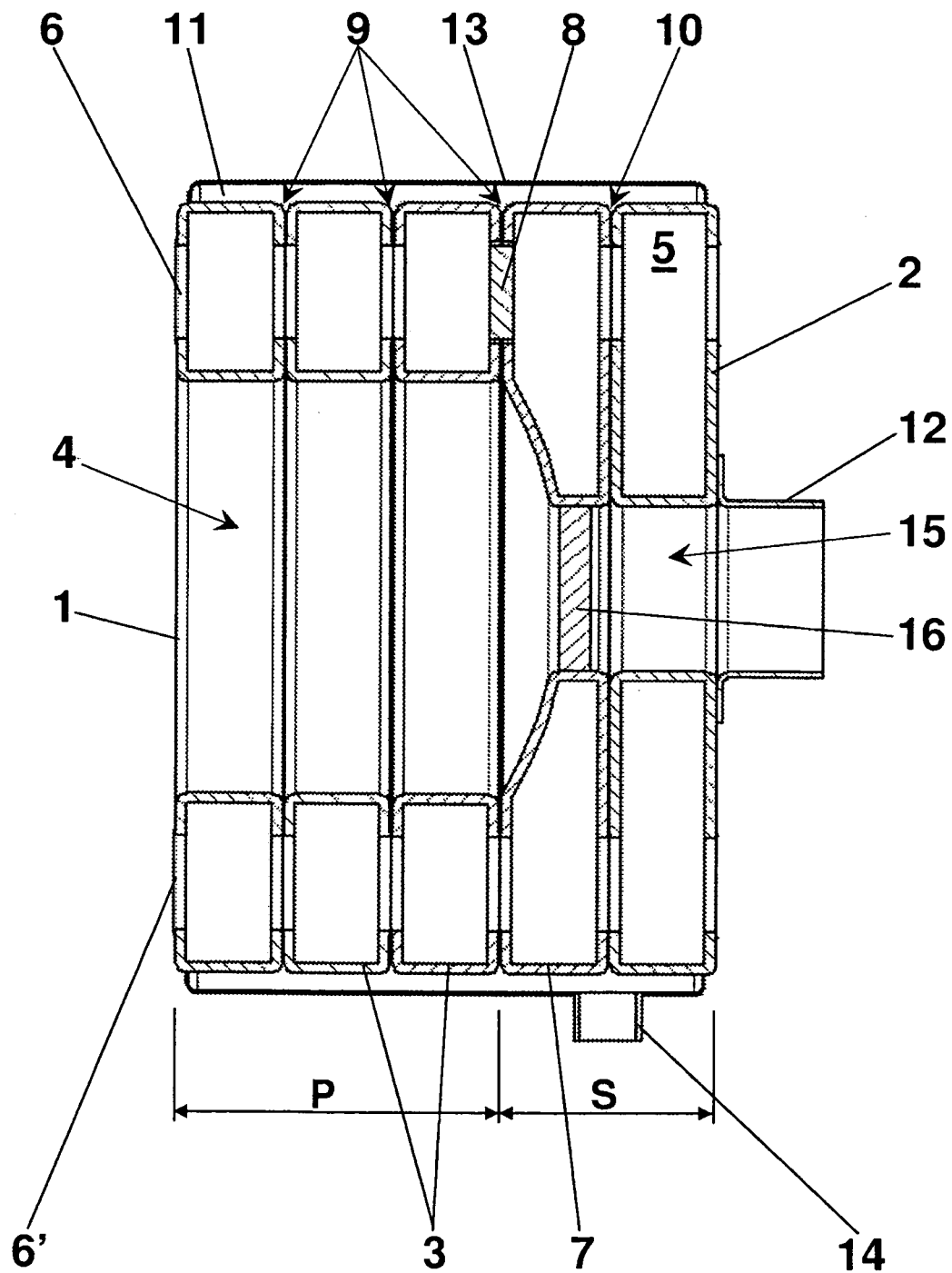
FIG. 2 shows a vertical longitudinal section through one half of the entire section block.

Each two adjacent sections 1, 2, 3, 7 have a matching geometry for forming an annular gap 9, 10. In the exemplary embodiment shown according to FIGS. 1 and 2, four radial, annular gaps 9, 10 are formed, FIG. 3 specifically showing a center section 3 having concavities.

Flue gas collection chamber 11 extends as a hollow cylinder around the outer jacket surfaces of sections 1, 2, 3, 7 and is limited to the outside by a jacket 13. A condensation water drain 14 is provided on the jacket.

Because a hub 6 is closed between primary section P and secondary section S using a closing means 8, the return water from the return connection piece (not shown) first only enters secondary section S and flows from there through remaining open hub 6' into primary section P. Primary section P is in connection with the feed connection (not shown).

Rear section 2 and furnace chamber floor center section 7 have, as an elongation of flue spigot 12, at least one through hole 15 which is closed within furnace chamber floor center section 7 on the heating gas side using a seal plug 16.

Figure 3:
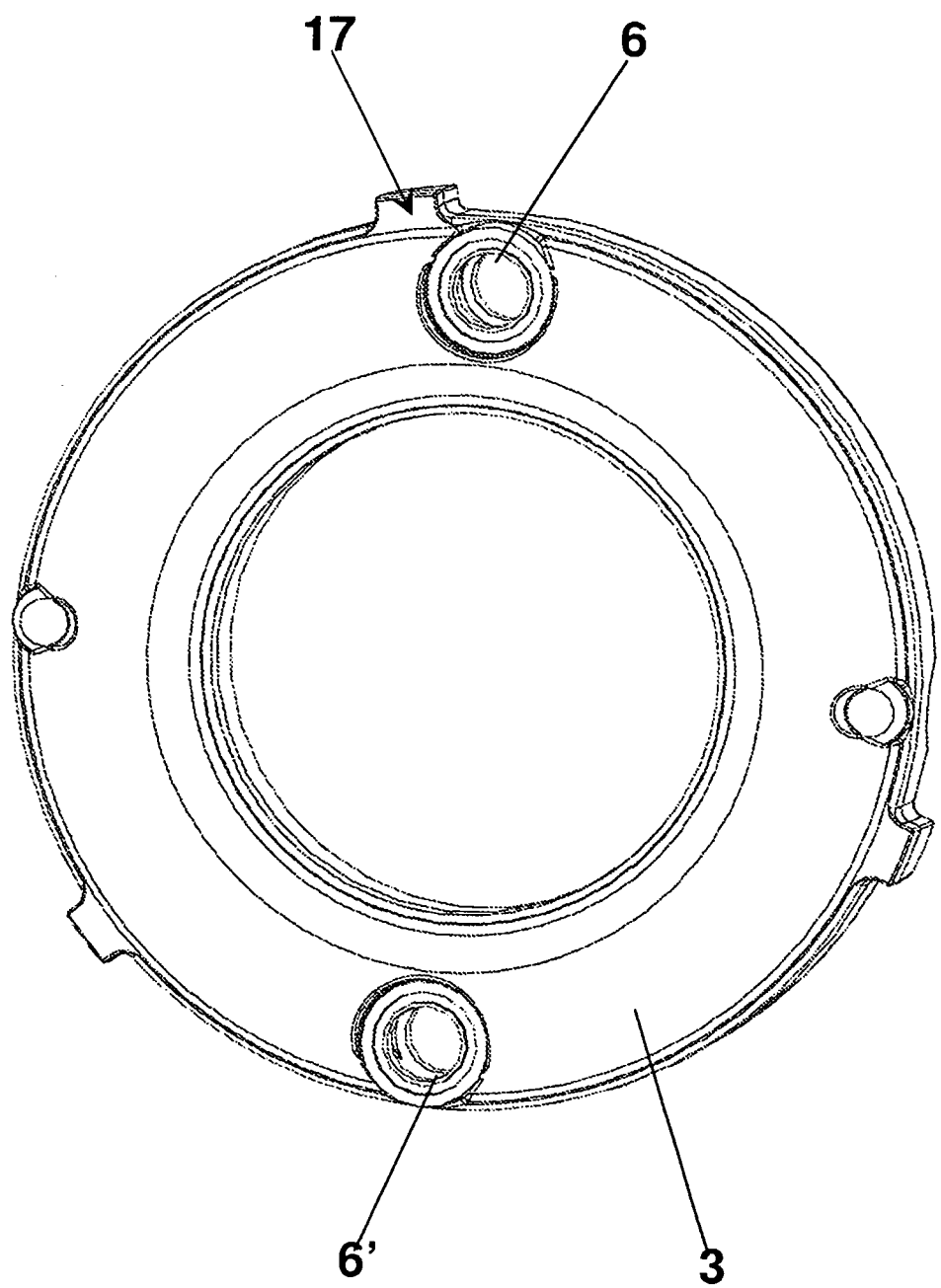
FIG. 3 shows a perspective view of a center section.

Furthermore, according to FIG. 3, three centering surfaces 17 on cast-on cams are situated on each section 1, 2, 3, 7 for maintaining an exact gap size between two adjacent sections 1, 2, 3, 7 in order to identify exactly the dimensions present after the casting process and use them for machining the hub areas.

What is claimed is:

1. A sectional boiler made of one of cast iron or aluminum, comprising:
    substantially annular sections including one front section, one rear section and at least one center section;
    wherein the sections together form a furnace chamber and satisfy the following conditions:
    the furnace chamber is substantially surrounded by heating gas passages and annular water compartments;
    the annular water compartments are connected to one another via hubs;
    the sections have one return connection piece, one feed connection piece, one flue spigot, and at least two anchor rods configured to hold the sections together;
    annular gaps are provided as heating gas passages between each two adjacent sections;
    the heating gas passages are subdivided into a primary portion and a secondary portion, the primary portion starting from the furnace chamber and extending approximately radially outwards and leading into a flue gas collection chamber on the outside of the sections, and at least one heating gas passage in the secondary portion extends radially inwards starting from the flue gas collection chamber to the flue spigot.

2. The sectional boiler as recited in claim 1, wherein each of two adjacent sections have a matching geometry for forming an annular gap.

3. The sectional boiler as recited in claim 2, wherein an annular gap is oriented orthogonally to the central axis of the furnace chamber and extends radially in a straight line to the outside in the primary portion and to the inside in the secondary portion.

4. The sectional boiler as recited in claim 2, wherein an annular gap extends along a radially curved path to the outside in the primary portion and to the inside in the secondary portion.

5. The sectional boiler as recited in claim 2, wherein an annular gap is tilted with respect to the central axis of the furnace chamber and extends in a straight line to the outside in the primary portion and to the inside in the secondary portion.

6. The sectional boiler as recited in claim 2, wherein an annular gap extends radially in a wave-like fashion to the outside in the primary portion and to the inside in the secondary portion.

7. The sectional boiler as recited in claim 2, wherein at least one of the width and the open cross section of an annular gap diminishes from the furnace chamber to the opening on the outside of the sections in the primary portion, and wherein at least one of the width and the open cross section of the annular gap diminishes from the flue gas collection chamber towards inside to the flue spigot in the secondary portion.

8. The sectional boiler as recited in claim 7, wherein the surfaces of the sections forming the gap and contacted by the heating gas are provided with a corrosion-resistant coating.

9. The sectional boiler as recited in claim 2, wherein the flue gas collection chamber on the outside of the sections extends in the form of a hollow cylinder around the outer jacket surfaces of the sections, and wherein the flue gas collection chamber is limited to the outside by a jacket sealingly accommodated between annular webs projecting radially outwards on the outside of the front section and the rear section.

10. The sectional boiler as recited in claim 2, wherein the hubs are alternately closed using a closure arrangement for providing a forced flow between the return connection piece and the feed connection piece.

11. The sectional boiler as recited in claim 10, wherein at least one hub between the primary portion and the secondary portion is closed using the closure arrangement, the feed connection piece in the area of the primary portion and the return connection piece in the area of the secondary section are situated in such a way that cooler return water first enters the secondary portion and subsequently overflows through the at least one hub into the primary portion.

12. The sectional boiler as recited in claim 2, further comprising:
    a furnace chamber floor center section forming the floor of the furnace chamber, wherein the interior of the furnace chamber is defined by the front section, the at least one center section and the furnace chamber floor center section.

13. The sectional boiler as recited in claim 12, wherein the front section and the at least one center section are part of the primary portion on the water side and the heating gas side, and wherein the rear section and the furnace chamber floor center section form the secondary portion at least on the water side by closing at least one hub between the furnace chamber floor center section and the at least one center section.

14. The sectional boiler as recited in claim 12, further comprising:
    at least one additional center section, wherein the rear section forming the secondary portion, the furnace chamber floor center section and the at least one additional center section together form the secondary portion at least on the water side.

15. The sectional boiler as recited in claim 14, wherein the rear section, the furnace chamber floor center section and the at least one additional center section have, as an elongation of the flue spigot, at least one through hole which is closed within the furnace chamber floor center section on the heating gas side using a seal plug.

16. The sectional boiler as recited in claim 12, further comprising:
    at least one additional center section, wherein the rear section and the at least one additional center section form the secondary portion at least on the water side by closing at least one hub between the furnace chamber floor center section and the at least one additional center section, and wherein the furnace chamber floor center section is associated with the primary portion on the water side.

17. The sectional boiler as recited in claim 12, wherein the flue spigot is situated on the common central axis of the sections and the furnace chamber.

18. The sectional boiler as recited in claim 12, wherein at least two centering points are provided on each section of the sectional boiler for maintaining an exact gap size between two adjacent sections, and wherein the centering points determine the contact surfaces on the hubs.

\* \* \* \* \*